(12) United States Patent
Depondt et al.

(10) Patent No.: US 8,505,151 B2
(45) Date of Patent: Aug. 13, 2013

(54) CONNECTING DEVICE FOR THE ARTICULATED CONNECTION OF A WIPER BLADE TO A WIPER ARM

(75) Inventors: Helmut Depondt, Kessl-Lo (BE); Yves Janssis, Sint-Truiden (BE); Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 13/063,886

(22) PCT Filed: Jan. 29, 2009

(86) PCT No.: PCT/EP2009/051005
§ 371 (c)(1),
(2), (4) Date: Jun. 28, 2011

(87) PCT Pub. No.: WO2010/028866
PCT Pub. Date: Mar. 18, 2010

(65) Prior Publication Data
US 2011/0247166 A1     Oct. 13, 2011

(30) Foreign Application Priority Data
Sep. 13, 2008   (DE) .......................... 10 2008 047 252

(51) Int. Cl.
*B60S 1/40* (2006.01)
*B60S 1/38* (2006.01)
(52) U.S. Cl.
USPC .................................. 15/250.32; 15/250.351

(58) Field of Classification Search
USPC ............. 15/250.43, 250.44, 250.361, 250.32,
15/250.201, 250.451–250.454, 250.33, 250.351
See application file for complete search history.

(56) References Cited

U.S. PATENT DOCUMENTS

| 7,716,780 | B2 | 5/2010 | Scholl et al. |
| 2006/0218740 | A1 | 10/2006 | Coughlin |
| 2009/0199357 | A1 | 8/2009 | Thienard |
| 2009/0307862 | A1 | 12/2009 | Boland |

FOREIGN PATENT DOCUMENTS

| CN | 102251180 | 11/2011 |
| WO | 2005/039944 A1 | 5/2005 |
| WO | 2006/106006 A1 | 10/2006 |
| WO | 2008/003675 A1 | 1/2008 |

OTHER PUBLICATIONS

PCT/EP2009/051005 International Search Report.

*Primary Examiner* — Gary Graham
(74) *Attorney, Agent, or Firm* — Michael Best & Friedrich LLP

(57) ABSTRACT

A connecting device for the articulated connection of a wiper blade to a wiper arm, wherein the connecting device comprises an adapter with a button on the end of the drive side thereof above a spring clip, wherein the button is connected via a spring tongue to the adapter and protrudes beyond the upper edges of the lateral walls. The lateral walls at the lower edges thereof have a protruding guide rail on which a stop is provided.

17 Claims, 6 Drawing Sheets

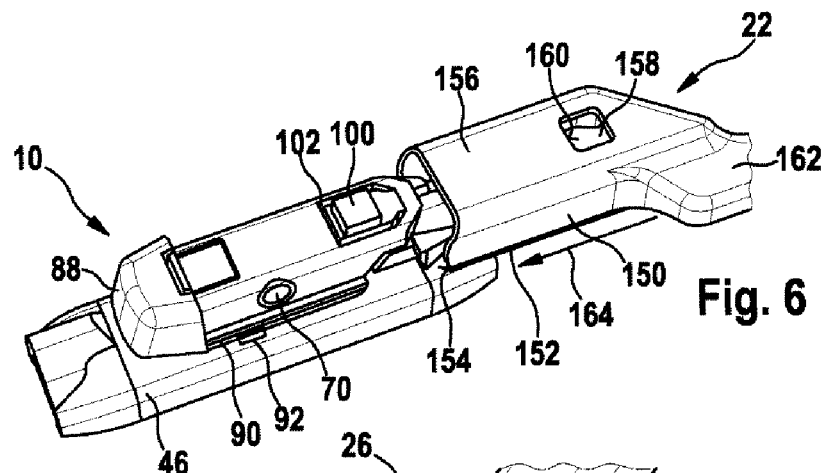
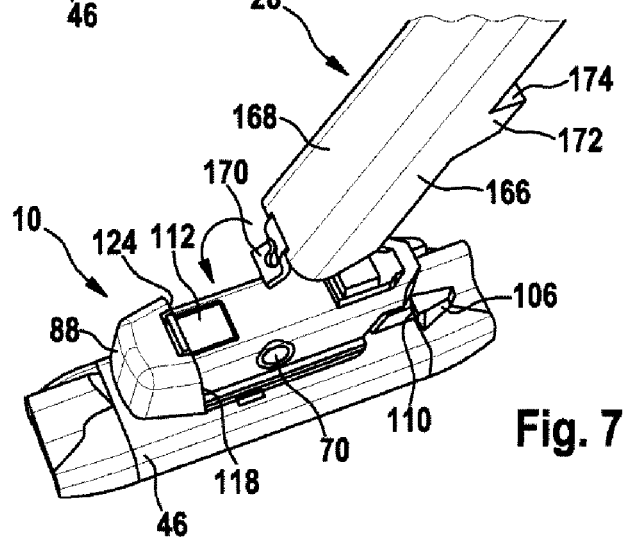
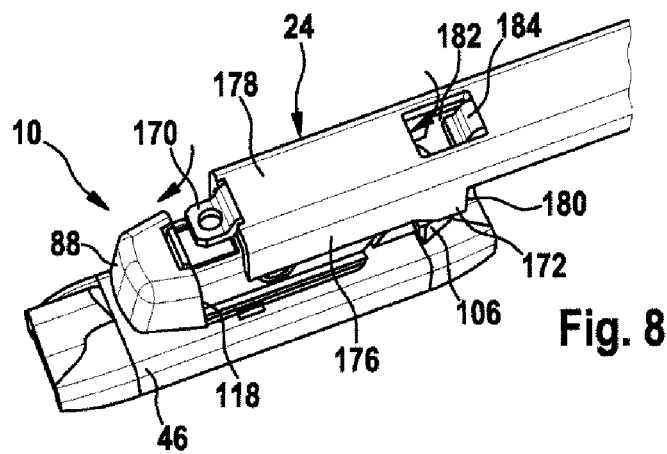

CONNECTING DEVICE FOR THE ARTICULATED CONNECTION OF A WIPER BLADE TO A WIPER ARM

BACKGROUND OF THE INVENTION

The invention is based on a connecting device for the articulated connection of a wiper blade to a wiper.

DE 20 2005 021 307 U1 discloses a connecting device for the articulated connection of a wiper blade of flat bar construction, which connecting device is suitable for different wiper arms. The connecting device comprises at least one single-part or multi-part connecting element which is fastened fixedly, but releasably, to a supporting element in the form of spring rails and has a bearing element on which or in which a bearing element connected fixedly to the wiper arm is pivotably mounted, and optionally one or more intermediate pieces by means of which the connecting options for the connecting element can be matched to the receiving devices of the joining element of the wiper arm. Said joining pieces differ for all of the use options for the connecting device. The connecting device is suitable for a wiper arm with a hook-shaped end or joining element or an end or joining element with a lateral bearing pin and a bridge corresponding to a known sidelock principle, or a wiper arm with an end or joining element, in which the wiper arm runs substantially rectilinearly above the wiper blade and is connected to the connecting element according to the toplock principle.

Another connecting device for the articulated connection of a wiper blade to a wiper arm is known from DE 103 47 637 A1. In this case, a connecting element in the form of a sheet-metal claw has a central longitudinal web which faces away from the supporting element of the wiper blade and into which a transversely running pivot spindle is inserted in a rotationally fixed manner. An adapter with bearing openings which are arranged in lateral spring tongues is mounted pivotably on the pivot spindle, which projects in a floating manner on both sides of the longitudinal web. The adapter, which is manufactured from plastic, surrounds the sheet-metal claw from the outside and is clipped by means of latching elements and retaining elements into a joining element which is open toward the wiper blade and is connected fixedly to the wiper arm. The adapter is guided laterally on the sheet-metal claw by means of inner guide webs and is inserted at the side walls thereof in a play-free manner in the joining element. Use is made for this purpose of a push button which is provided at the end of a spring tongue in a cover wall of the adapter and, in the fitted state, latches into a matching latching hole in a cover wall of the joining element.

DE 10 2006 031 514 A1 discloses a wiper blade for windows of motor vehicles, the wiper blade having a connecting element in the central region for the articulated connection to a wiper arm. The connecting element comprises a basic element which is composed of two side parts which have mutually facing, open longitudinal grooves. By means of the latter, said side parts sit on spring rails which serve as a supporting element, are partially embedded in lateral longitudinal grooves of a wiper strip and, at least in the region of the connecting element, project laterally out of the longitudinal grooves for a distance. The longitudinal grooves of the basic element are delimited downward by a lower limb and upward by an upper limb. On the upper limb, a projection is arranged in one end region and a clearance is arranged in the other end region, the projection and clearance each being directed toward the opposite side part. The projection of the one side part fits into the clearance in the other side part, and vice versa. In the fitted state, the projections in the clearances fix the side parts in the longitudinal direction to each other and define the distance between the longitudinal grooves transversely with respect to the wiper blade. On one side of each projection and at each clearance there are in each case two bearing surfaces which are inclined with respect to the longitudinal direction, the bearing surfaces on the projection forming a convex roof surface which fits into a concave roof surface which is formed by the bearing surfaces at the clearances. The side parts are therefore locked in the direction of the vertical axis.

A latching hook is provided on those sides of the clearance which are opposite the bearing surfaces, the latching hook latching, upon installation, into a latching depression on the projection of the other side part in each case. The projections and the assigned clearances together with the associated bearing surfaces and latching hooks form a guide block which engages in a clearance in a base of a sheet-metal claw. The sheet-metal claw which forms the actual connecting part surrounds the side parts from the outside by means of feet bent out of the base. At the ends of the sheet-metal claw, longitudinally directed tabs are integrally formed on the feet, said tabs, upon installation, being bent over into corresponding recesses in the basic element. Between the feet, side walls are bent over in opposite directions from the base by approximately 90 degrees. The side walls carry a bearing pin, which is riveted to the side walls, as a hinge part.

SUMMARY OF THE INVENTION

According to the invention, the adapter has a push button at the drive-side end thereof above the spring clip, said push button being connected to the adapter via a spring tongue and projecting over the upper edges of the side walls. The lower longitudinal edges of the side walls each have a laterally projecting guide rail on which a stop is provided. The connecting device according to the invention is therefore suitable with the same components for two different wiper arms or joining elements.

On the front end side thereof, the first wiper arm has a tab by means of which said wiper arm is held in a clearance at the free end of the adapter while said wiper arm is fixed on the latching cams of a spring clip of the adapter by means of projections with undercuts on its side walls. In this case, the wiper arm, which is connected to the wiper blade according to the toplock principle, runs above the wiper blade. Furthermore, connection is also possible to a wiper arm which is likewise connected to the wiper blade according to the toplock principle, but in which the wiper arm is laterally offset with respect to the wiper blade. In this case, the joining element engages under the guide rails of the adapter by means of laterally inwardly projecting edges on the side walls, with the end surfaces of the edges coming to bear against a stop of the guide rails of the and adapter when the push button latches into a latching opening in a cover wall of the joining element. So that the push button is not unintentionally released, it is expedient for said push button to have a channel toward the free end of the adapter, in which channel the front edge of the latching opening latches.

According to a refinement of the invention, the latching cams each have two stop surfaces, of which the first stop surface facing the supporting element is inclined at an acute angle with respect thereto while the second stop surface adjoins the first stop surface and runs approximately perpendicularly to the supporting element. With such a refinement, a further type of wiper arm can additionally be connected to a wiper blade using the same connecting device according to the invention. Said wiper arm is likewise held in the clearance in the adapter by means of a tab while a second tab, which is integrally formed on a drive-side edge of an opening in the cover wall of the joining element, engages under a web in the region of the push button of the and adapter while the front edge of the opening is latched to the channel of the push button. At the same time, the second stop surfaces engage behind projections on the side walls of the joining element, the flanks of which stop surfaces run approximately perpendicularly to the supporting element.

According to a refinement of the invention, the clearance at the front end of the adapter is expediently closed by a filler piece which is connected to a cover wall of the adapter via a spring tongue. Upon installation, the spring tongue can be pressed back by the tab on the front end wall of the joining element such that the tab can slide into the clearance.

According to a further refinement of the invention, it is proposed that the hinge part is a bearing bolt with a bearing bore. On the outer circumference of the hinge part which projects laterally for a distance over the hinge-part carrier, the adapter is mounted in the side walls thereof by means of bearing openings while the bearing bore in the hinge part permits the connection of a wiper arm according to the sidelock principle, in which a hinge pin arranged at the side of the joining element is mounted in the bearing bore in the hinge part while a bridge which is connected fixedly to the joining element engages by means of the bent end thereof over the adapter. For visual reasons, use is expediently made here of an adapter cap which is placed onto the adapter and is fixed between the stop on the guide rails of the adapter and the push button which is latched in a latching opening in the cover wall of the adapter cap. In one of the side walls thereof, the covering cap has a recess for the bent end of the bridge of the joining element while a bearing opening for the hinge pin is provided in the opposite side wall.

The connecting part is expediently manufactured from plastic. In this case, a hinge-part carrier is integrally formed on the outside of the cover wall thereof, the hinge-part carrier being connected to the hinge part as a single piece. The thickness of the hinge-part carrier is matched to the distance between the side walls of the adapter, and therefore the hinge-part carrier is guided laterally in the adapter while the latter is mounted pivotably on the projecting lengths of the hinge part. The insides of the side walls of the connecting part also have latching cams which fit into recesses on the outsides of the side parts of the basic element. The connecting part is thereby fixed on the basic element. At the same time, connecting profiles for spoiler parts, with which the wiper blade may be equipped, can be provided on the end sides of the connecting part.

To be able to fasten the connecting device securely to the wiper blade and nevertheless to be able to fit said connecting device easily, the basic element is expediently divided in the longitudinal direction, with the side parts sitting on the supporting element with their longitudinal grooves facing each other such that the connecting part laterally surrounds the side parts and holds the latter together. In order to facilitate the installation of the connecting part, it may be expedient for the side parts of the basic element to be held together in the region of the ends thereof by a respective latching hook which engages in a latching depression in the other side part.

According to a further refinement of the invention, it is proposed that the connecting part is designed as a sheet-metal claw. This is a tried and trusted structural element both with regard to the strength and durability thereof. The sheet-metal claw, by means of the feet thereof, laterally surrounds the basic element and, by means of tabs directed in the longitudinal direction to the ends of the connecting part, engages in the recesses on the outsides of the basic element. The connecting part has two side walls which run parallel in the longitudinal direction and into side openings of which the hinge part is inserted in the form of a bearing bolt with a bearing bore and has a projecting length on both sides. When a sheet-metal claw is used, it is advantageous for visual reasons for a covering, the end sides of which have connecting profiles for spoiler parts, to be clipped onto the basic element or the connecting part.

It is also possible in this embodiment to use a wiper arm according to the sidelock principle. For this purpose, the connecting device comprises an adapter cap which has a recess on one side wall while a bearing opening is provided in the other side wall. The adapter cap is expediently connected to the covering and, on the end side pointing toward the free end, expediently has wings which engage in the covering. A visually closed design can be obtained here if the adapter cap has a bulge in the region of the push button, the bulge covering the push button on the outside.

BRIEF DESCRIPTION OF THE DRAWINGS

Further advantages emerge from the description below of the drawings. Exemplary embodiments of the invention are illustrated in the drawing. The drawing, the description and the claims contain numerous features in combination. A person skilled in the art will expediently also consider the features individually and put them together to form meaningful further combinations.

In the drawing:

FIG. 6 shows a perspective view of a connecting device during installation of a second wiper arm, FIG. 7 shows a perspective view of a connecting device during installation of a third wiper arm, FIG. 8 shows a perspective view of a connecting device during installation of a fourth wiper arm.

DETAILED DESCRIPTION

Figure 1:
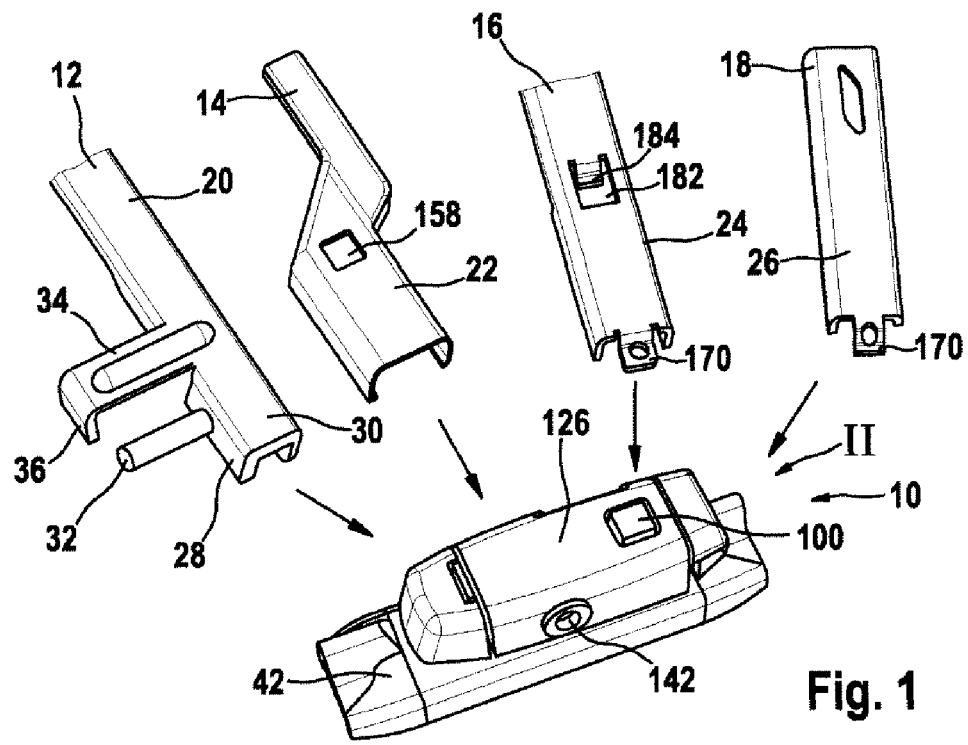
FIG. 1 shows, in a perspective view, an arrangement of ends or joining elements of four different wiper arms and a connecting device according to the invention.
Figure 2:
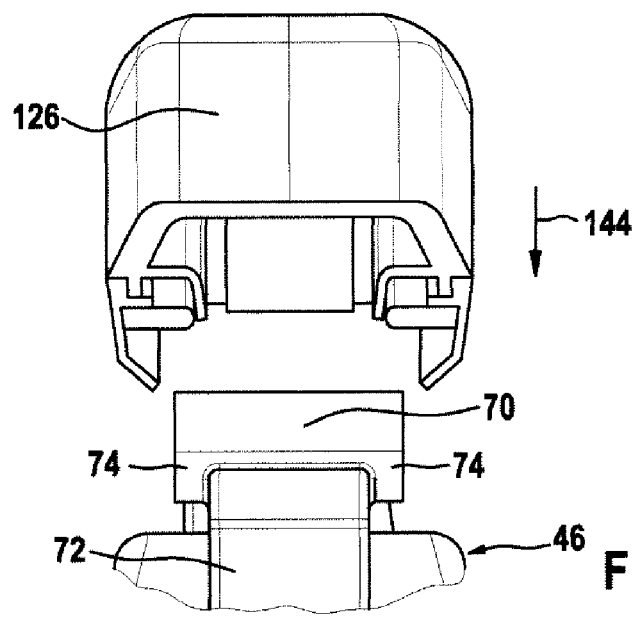
FIG. 2 shows a perspective partial view in the direction of an arrow II in FIG. 1 during installation.

The arrangement according to FIG. 1 illustrates a connecting device 10 which can be combined with four different wiper arms, specifically with a first wiper arm 12 which, at the end thereof, has a joining element 20 for a sidelock connection, with a second wiper arm 14 having a joining element 22 for a toplock connection, with a third wiper arm 16 having a joining element 24 for a toplock connection, and with a fourth wiper arm 18 having a joining element 26 likewise for a toplock connection. The connecting elements 20, 22, 24, 26 can be integrally formed as a single piece on the wiper arms 12, 14, 16, 18 or can be connected fixedly thereto as separate components.

Figure 3:
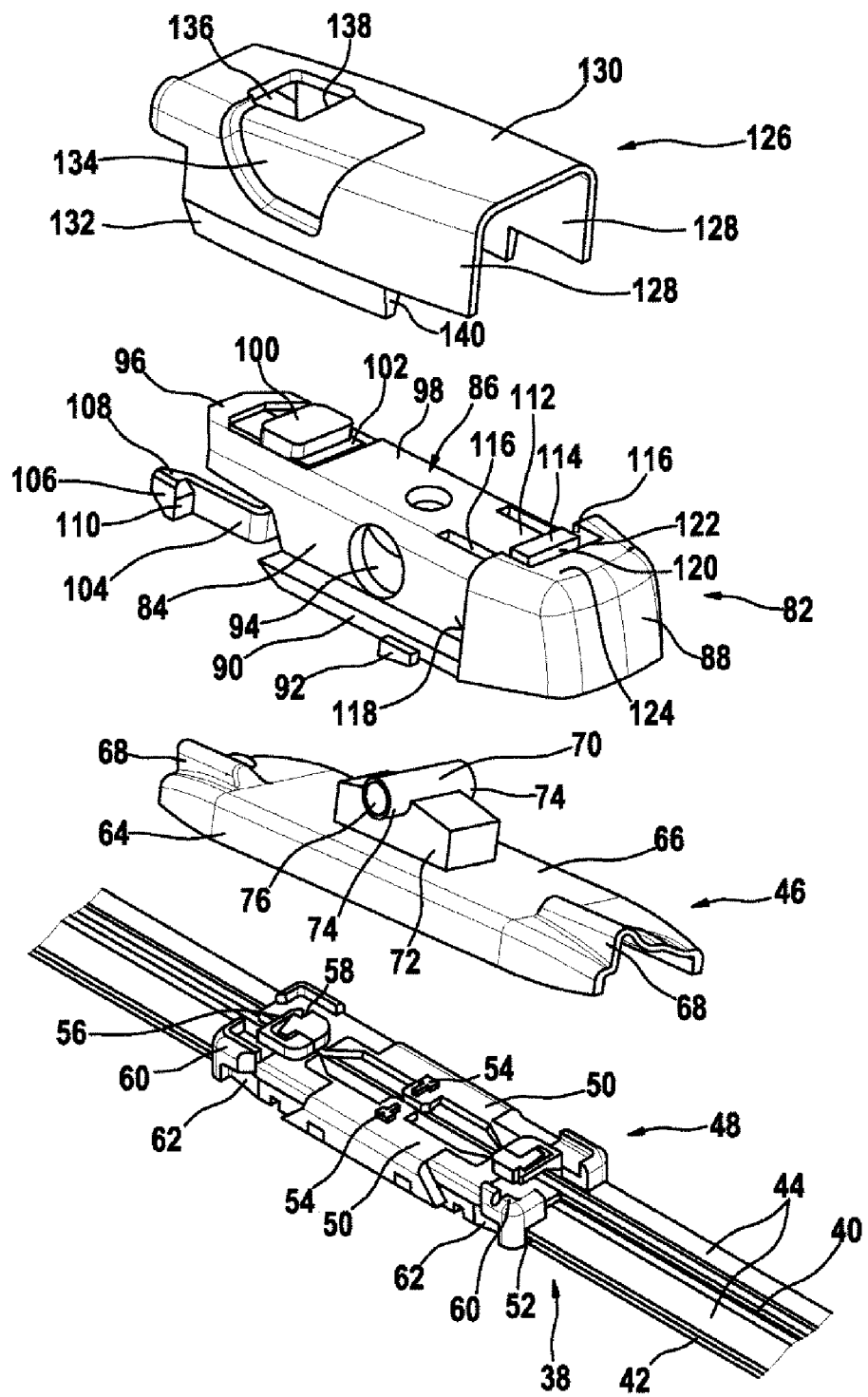
FIG. 3 shows a perspective view of a connecting device according to invention in an exploded illustration.
Figure 4:
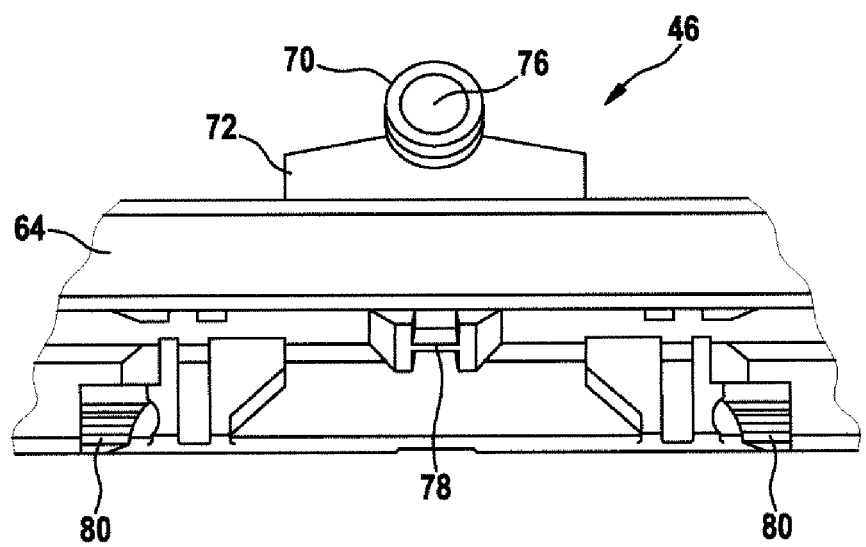
FIG. 4 shows an enlarged side view of a connecting element obliquely from below in the region of a hinge part.

The connecting device 10 is illustrated in more detail in FIG. 3 together with a wiper blade 38, of which, to the extent necessary for understanding the invention, only a supporting element 44 in the form of two spring rails is shown, the supporting element holding a wiper strip by way of the head strip thereof. The wiper strip also has a wiper lip 42 which is connected to the head strip 40 via a tilting web (not visible).

A basic element 48 which is divided in the longitudinal direction into two side parts 50 and laterally surrounds the supporting element 44 by means of longitudinal grooves 52 sits on the supporting element 44. The side parts 50 are held together by latching hooks 56 which are each arranged in an end region of a side part 50 and interact in a complementary manner with latching depressions 58 in the other side part. Reinforcements 60 in which lateral recesses 62 which face one another in the longitudinal direction and serve for the fastening of a connecting part 46 are provided on the outer corners of the basic element 48.

The connecting part 46 which, in the embodiment according to FIG. 3, is produced from plastic by injection molding, has side walls 64 which are connected to each other by a cover wall 66. Furthermore, connecting profiles 68 for spoiler parts (not illustrated) are integrally formed on the end sides. A hinge-part carrier 72 which is oriented in the longitudinal direction and is connected as a single piece to a substantially cylindrical hinge part 70 is integrally formed on the outside of the cover wall 66. The hinge part 70 has the form of a bearing bolt with a bearing bore 76, the hinge part 70 having a respective projecting length 74 on the sides of the hinge-part carrier 72. An adapter 82 is mounted pivotably on the projecting lengths 74 by means of bearing openings 94. The latter are located in side walls 84 of the adapter, which side walls are connected to each other by a cover wall 86, a front wall 88 and a web 96. The front wall 88 is guided into the region of the side walls 84 and forms a step 118 with respect to the side walls 84 and the cover wall 86. In the region of the cover wall 86, the front wall 88 has a clearance 120 which is delimited by an edge 122.

Part of the cover wall 86 is in the form of a spring tongue 112 which, at the end thereof directed toward the clearance 120, bears a filler piece 114 which projects into the clearance 120 and ends at the step 118. At the opposite end of the cover wall 86 there is a push button 100 which is connected to the adapter 82 via a spring tongue 98 and projects over the cover wall 86. On the side facing the front wall 88, the push button 100 has a channel 102.

Laterally projecting guide rails 90, on which stops 92 acting in the longitudinal direction are provided, are integrally formed on the lower edge of the side walls 84 of the adapter 82.

Toward the drive-side end, the adapter 82 has a spring clip 104 which can be coupled to the push button 100 such that it changes its position depending on the position of the push button 100. The side walls 84 are correspondingly retracted in the region of the spring clip 104. Toward the drive-side end, the spring clip 104 has laterally projecting latching cams 106 which have a first stop surface 110 and a second stop surface 108 adjoining the latter. The two stop surfaces 108, 110 face the step 118 of the front wall 88, the one stop surface 110 being inclined at an acute angle with respect to the supporting element 44 while the other stop surface 108 is directed approximately perpendicularly to the supporting element 44. The connecting device 10 can optionally have an adapter cap 126. The latter is expedient if the connecting device 10 is intended to be combined with a first wiper arm 12 according to the sidelock principle. The adapter cap 126 has two side walls 128 which are connected to each other by a cover wall 130. Guide rails 132 with which the adapter cap 126 is guided on the guide rails 90 of the adapter 82 and bear against the stops 92 are integrally formed on the free longitudinal edges of the side walls 128. The adapter cap 126 is secured in the longitudinal direction by the push button 100 which engages in a latching opening 136 in the cover wall 130 and latches by means of the channel 102 thereof on the front edge 138 of the latching opening 136. A recess 134 is located in one of the side walls 128 while a bearing opening 142 is provided in the opposite side wall 128.

The connecting device 110 is fitted by the connecting part 146 being plugged onto the preassembled basic element 48 in the direction of an arrow 144. In the process, latching cams 80 on the insides of the side walls 64 of the connecting part 46 engage in the recesses 62 on the outsides of the basic element 48. The connecting part 46 is centered in the longitudinal direction by a centering means 78 on the inside of the cover wall 66, which centering means interacts with centering cams 54 on the basic element 48. The adapter 82 is then clipped by means of the bearing openings 94 thereof onto the projecting lengths 74 of the hinge part. The adapter cap 126 is subsequently placed thereon.

Figure 5:
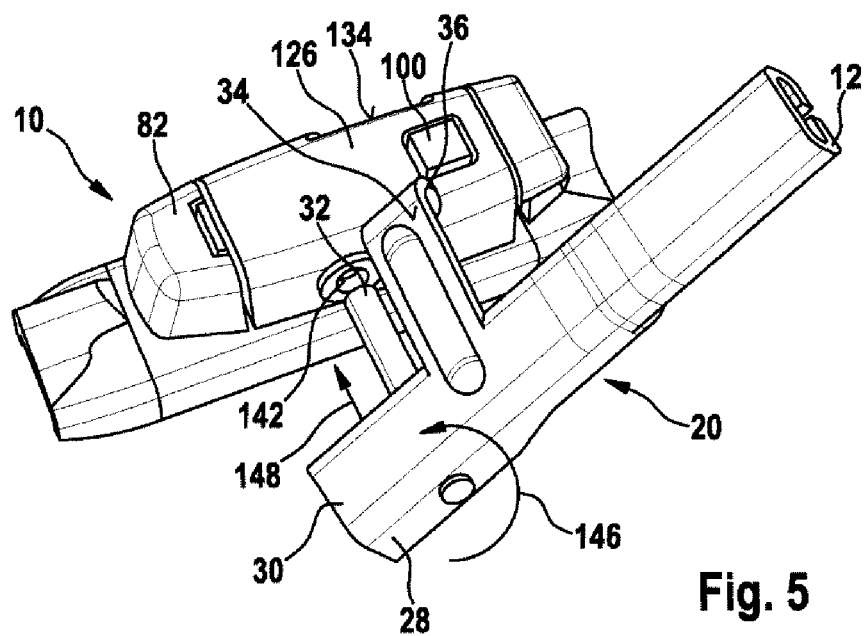
FIG. 5 shows a perspective view of a connecting device during installation of a first wiper arm.

The wiper blade preassembled in this manner is connected to the first wiper arm 12 by the latter being pivoted relative to the wiper blade 38 in the direction of an arrow 146 (FIG. 5) and then being moved in the direction of the arrow 148. In the process, the hinge pin 32 which is attached laterally to the joining element 20 is guided through the bearing opening 142 in the side wall of the adapter cap 126 into the bearing bore 76 of the hinge part 70 of the connecting part 46. When the first wiper arm 12 pivots back, a bent end 36 of a bridge 34 of the joining element 20 engages in the recess 134 in the adapter cap 126 such that the wiper blade 38 is secured relative to the wiper arm 12 in the longitudinal direction of the hinge pin 32.

The adapter cap 126 is not needed for installing the second wiper arm 14 using the connecting device 10. The end of the wiper arm 14 or of the joining element 22 has two side walls 150 which are connected to each other by a cover wall 156. A latching opening 158 is located in the latter, said latching opening latching by means of the front edge thereof in the channel 102 of the push button 100 when the connecting element 22 is pushed onto the adapter in the direction of an arrow 164. Inwardly projecting edges 152 are located on the lower borders of the side walls 150, the end sides 154 of which edges bear, in the fitted state, against the stops 92 of the adapter 82 while the edges 152 engage under the guide rails 90 of the adapter 82. The joining element 22 has a bent portion 162 toward the wiper arm 14, and therefore the wiper arm 14 runs substantially laterally parallel to the wiper blade 38.

The installation of the fourth wiper arm 18 by the joining element 26 thereof is illustrated in FIG. 7. The joining element has two side walls 166 which are connected to each other by a cover wall 168. Offset toward the drive-side end, the side walls 72 have projections 172 toward the supporting element 44, the projections having undercuts 144 toward the drive-side end. A tab 170 which is bent toward the supporting element 44 is integrally formed on the end side of the cover wall 168. Upon installation, the spring tongue 112 together with the filler piece 124 is pressed back by the tab 170 such that the tab 170 passes under the supporting wall 124 and is partially accommodated in the clearance 120. When the wiper blade pivots back into the operating position, the adapter 82 is fixed to the joining element 26 by the undercuts 174 interacting with the stop surfaces 110 of the latching cams 106 of the adapter 82.

The third wiper arm 16 has a joining element 24 with two side walls 76 which are connected to each other by a cover wall 178. In a similar manner to the side walls 166 of the joining element 26, the side walls 176 have projections 172, but the flanks 180 thereof, which face the driving side, run approximately perpendicularly to the supporting element 44. In the fitted state, the flanks 180 interact with stop surfaces 108 of the latching cams 106 which are inclined with respect to the supporting element 44 in substantially the same manner as the flanks 180. On the end side thereof, the joining element 24 likewise has a tab 170 which is bent toward the supporting element 44 and with which the spring tongue 112 is pushed back and which slides under the supporting wall 124.

In the cover wall 178 thereof, the joining element 24 has an opening 182, on the drive-side edge of which a tab 184 is integrally formed, said tab being bent inward such that, upon installation, said tab engages in the longitudinal direction under a web 96 in the region of the push button 100. At the same time, the push button 100 engages by means of the channel thereof on the front edge of the opening 182.

Figure 9:
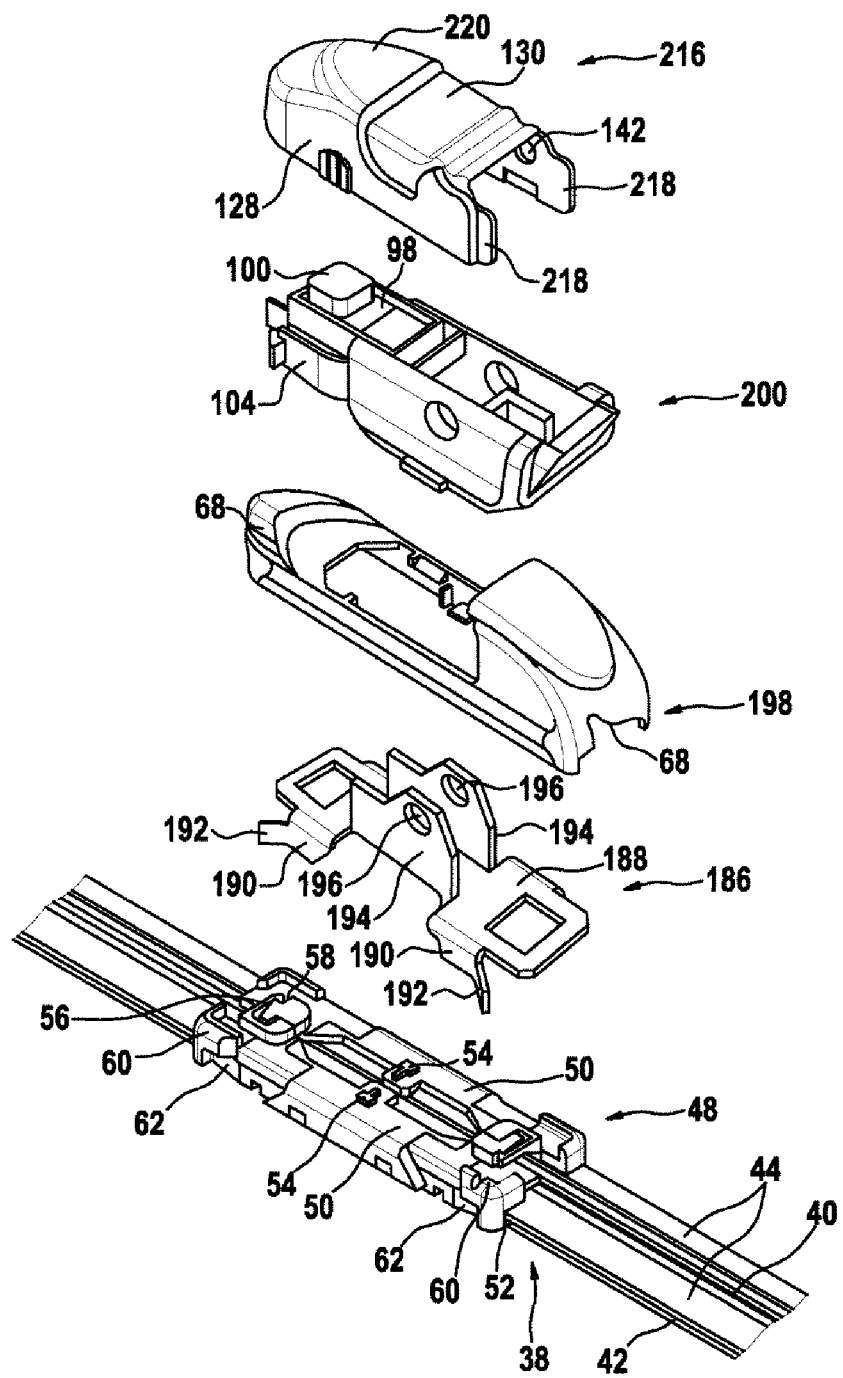
FIG. 9 shows an alternative to FIG. 3.

The version according to FIG. 9 differs from the exemplary embodiment previously described essentially in that a connecting part 186 in the form of a sheet-metal claw is connected to the basic element 48. Said sheet-metal claw has a base 188 from which feet 190 are bent over toward the basic element 48 and laterally surround the side parts 50. Toward the ends in the longitudinal direction, tabs 192 are integrally formed on the feet 190 and, in the fitted state, fit into the recesses 62 in the side parts 50. Between the feet 190, side walls 194, in which openings 196 for receiving the hinge parts 70 are provided, are bent away from the base in the opposite direction to said feet. The side walls 194 therefore serve as a hinge-part carrier and, like the hinge-part carrier 72, are matched in width in the distance therebetween to the distance between the side walls 84 of the adapter 82 or of an adapter 200 such that the adapter is guided on the insides of the side walls thereof by means of the outsides of the side walls 1 of the 94. For design reasons, the basic element 48 and the connecting part 186 are expediently covered by a covering 198 which, on the end sides thereof, has connecting profiles 68 for spoiler parts (not illustrated).

Figure 10:
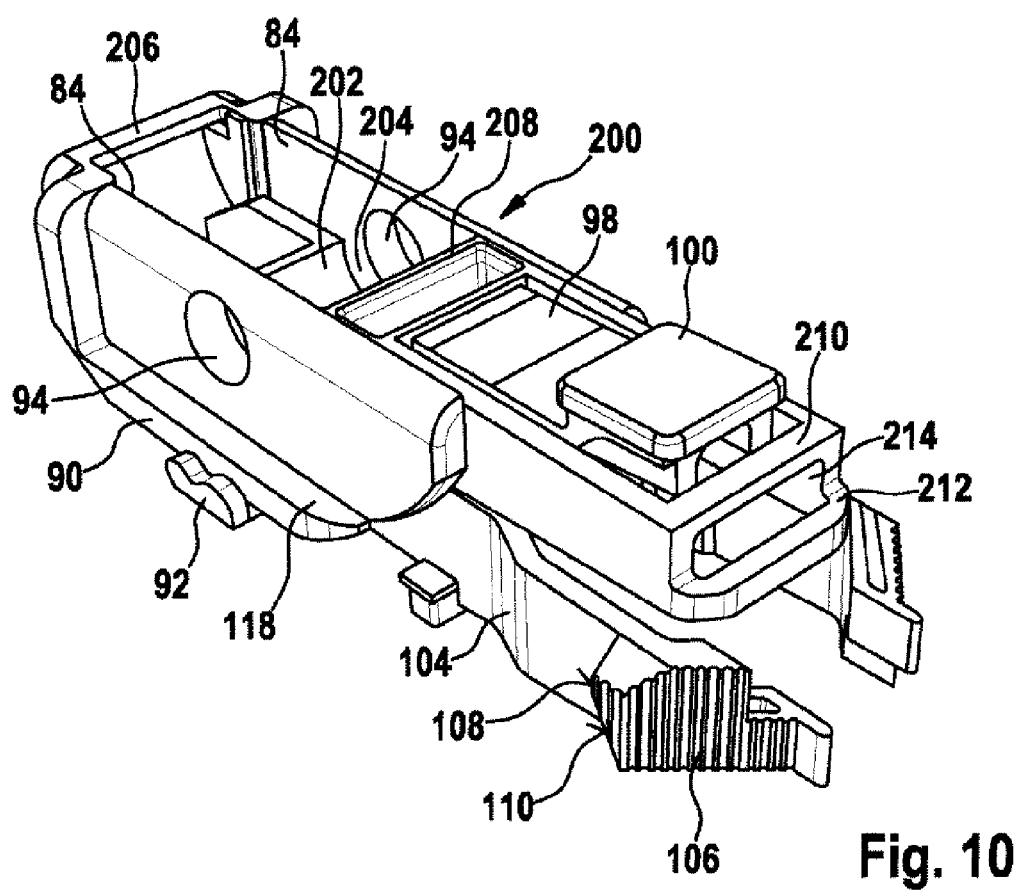
FIG. 10 shows an adapter corresponding to FIG. 9 on an enlarged scale from a different perspective.

The adapter 200 which is constructed in a substantially identical manner to the adapter 82 is illustrated in enlarged form in FIG. 10. In order to avoid repetitions, only the differences are pointed out. Thus, the adapter 200, in the region of the front side, has a first transverse web 206 which forms the clearance 120, in the central region has a second transverse web 208 and, at the drive-side end thereof in the region of the push button 100, has a third transverse web 210 and a fourth transverse web 212. The latter runs toward the supporting element in a manner somewhat offset in relation to the third transverse web 210 such that the tab 170 of the third wiper arm 116 can engage in a gap 214 between the third transverse web 210 and the fourth transverse web 212 and is supported on the third transverse web 210. Furthermore, the adapter 200 has a bearing shell 202 for the hinge part 70 between the bearing openings 94. The bearing shell 202 forms an opening 204 with respect to the side wall 84 of the adapter for the passage of the side walls 194 of the connecting part 186. The hinge part 70 is fitted only when the basic element 48, the connecting part 186, the covering 198 and the adapter 200 have been fitted or preassembled.

In order to connect a first wiper arm 12, an adapter cap 216 is provided, the side walls 128 of which are connected to each other by a cover wall 130. The adapter cap 216 adjoins the covering 198 and engages by means of wings 218 on the end sides of the side walls 128 thereof into the covering 198. In the region of the push button 100 of the adapter 200, the adapter cap 216 has a bulge 220, thus producing a closed design after the adapter cap 216 is installed. The wiper arms 12, 14, 16, 18 can be fitted in the same manner as has been described in conjunction with the previous exemplary embodiment.

The invention claimed is:

1. A connecting device (10) for the articulated connection of a wiper blade (38) to a wiper arm (12, 14, 16, 18), wherein the connecting device (10) comprises a connecting element which is fixedly connected to a supporting element (44) of the wiper blade (38) and which includes a basic element (48) and a connecting part (46, 186) which has a hinge-part carrier (72, 194) which runs in a longitudinal direction, which laterally guides an adapter (82, 200) on insides of side walls of the adaptor and which carries a transversely directed hinge part (70) which, on each side of the hinge-part carrier (72, 194), has a projecting length on which the adapter (82, 200) is pivotably mounted, which adapter can be fastened releasably to the free end of the wiper arm (12, 14, 16, 18) or to a joining element (20, 22, 24, 26) connected fixedly to the wiper arm, and the adaptor having at a drive-side end a spring clip (104) which, on outwardly facing side surfaces thereof, has projecting latching cams (106) which have stop surfaces (110) which face a free end and enclose acute angles with the supporting element (44) while, at the free end, the side walls (84) have steps (118) which, together with a web, form a clearance (120), characterized in that the adapter (82, 200) has a push button (100) at the drive-side end thereof above the spring clip (104), said push button being connected to the adapter (82, 200) via a spring tongue (98) and projecting over upper edges of the side walls (84), and in that lower borders of the side walls (84) each have a projecting guide rail (90) on which a stop (92) is provided.

2. The connecting device (10) as claimed in claim 1, characterized in that the push button (100) has a channel (102) toward the free end of the adapter (82, 200).

3. The connecting device (10) as claimed in claim 1, characterized in that the latching cams (106) each have two stop surfaces (108, 110), of which the first stop surface (110) facing the supporting element (44) is inclined at an acute angle with respect thereto while the second stop surface (108) adjoins the first stop surface (110) and runs approximately perpendicularly to the supporting element (44).

4. The connecting device (10) as claimed in claim 1, characterized in that the adapter (82, 200), toward the free end thereof, has a spring tongue (112), at a free end of which there is a filler piece (114) with which said spring tongue protrudes into the clearance (122).

5. The connecting device (10) as claimed in claim 1, characterized in that the hinge part (70) is a bearing bolt with a bearing bore (76).

6. The connecting device (10) as claimed in claim 5, characterized in that the connecting part (46) is manufactured from plastic, and in that the hinge-part carrier (72) is integrally formed on an outside of a cover wall (66) of the connecting part, the hinge part (70) being integrally formed as a single piece on the hinge-part carrier (72).

7. The connecting device (10) as claimed in claim 6, characterized in that insides of side walls (64) of the connecting part (46) have latching cams (80) which fit into recesses (62) on outsides of side parts (50) of the basic element (48).

8. The connecting device (10) as claimed in claim 6, characterized in that connecting profiles (68) for spoiler parts are provided on end sides of the connecting part.

9. The connecting device (10) as claimed in claim 1, characterized in that the adapter (82, 200) has an adapter cap (126) which adjoins the steps (118) and has a recess (134) at least in one side wall (128) while a bearing opening (142) is provided in an other side wall (128).

10. The connecting device (10) as claimed in claim 1, characterized in that the basic element (48) is divided in the longitudinal direction and side parts (50) sit on the supporting element (44) with longitudinal grooves (52) facing each other, the connecting part (46) laterally surrounding the side parts (50) and holding the side parts together.

11. The connecting device (10) as claimed in claim 10, characterized in that the side parts (50) are held together in a region of ends thereof by a respective latching hook (56) which engages in a latching depression (58) in an other side part (50).

12. The connecting device (10) as claimed in claim 1, characterized in that the connecting part (186) is designed as a sheet-metal claw which, by means of feet (190) thereof, laterally surrounds the basic element (48) and, by means of tabs (192) directed in the longitudinal direction to ends of the connecting part (200), engages in recesses (62) on outsides of the basic element (48).

13. The connecting device (10) as claimed in claim 12, characterized in that the connecting part (186) has two side walls (194) which run parallel in the longitudinal direction and into openings (196) of which the hinge part (70) is inserted and has a projecting length on both sides.

14. The connecting device (10) as claimed in claim 12, characterized in that a covering (198), end sides of which have connecting profiles (68) for spoiler parts, is clipped onto the basic element (48) or onto the connecting part (186).

15. The connecting device (10) as claimed in claim 14, characterized in that the device comprises an adapter cap (216) which has a recess (134) on one side wall (128) while a bearing opening (142) is provided in an other side wall (128).

16. The connecting device (10) as claimed in claim 15, characterized in that the adapter cap (216), on an end side pointing toward a free end, has wings (218) which engage in the covering (198).

17. The connecting device (10) as claimed in claim 14, characterized in that the adapter cap (216) has a bulge (220) in the region of the push button (100).

* * * * *

UNITED STATES PATENT AND TRADEMARK OFFICE
CERTIFICATE OF CORRECTION

PATENT NO. : 8,505,151 B2 Page 1 of 1
APPLICATION NO. : 13/063886
DATED : August 13, 2013
INVENTOR(S) : Depondt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 227 days.

Signed and Sealed this
Fifteenth Day of September, 2015

Michelle K. Lee
*Director of the United States Patent and Trademark Office*